July 13, 1971     H. P. WILLETT     3,592,630
REMOVAL OF OFF-GASES FROM OXYGEN STEEL CONVERTERS
Filed May 3, 1968     7 Sheets-Sheet 1

HOWARD P. WILLETT
INVENTOR.
BY *J. T. Chalely*
AGENT

HOWARD P. WILLETT
INVENTOR.

United States Patent Office 3,592,630
Patented July 13, 1971

3,592,630
REMOVAL OF OFF-GASES FROM OXYGEN STEEL CONVERTERS
Howard P. Willett, Darien, Conn., assignor to Chemical Construction Corporation, New York, N.Y.
Filed May 3, 1968, Ser. No. 726,332
Int. Cl. C21c 5/38
U.S. Cl. 75—60
12 Claims

ABSTRACT OF THE DISCLOSURE

Off-gas is removed from an oxygen steel converter through an air-ventilated hood. Oxygen in the inducted air reacts within the hood with carbon monoxide in the off-gas, and the resulting hot gas mixture is quench-cooled, usually by direct contact with water. The flow rate of the dry gas component of the resulting cold gas mixture is measured and the mixture flow rate is regulated, to provide essentially constant dry gas flow rate during all intervals between and during the blow period and the magnitude of the flow rate is controlled at a level which provides an excess of air at the onset interval and termination interval of the blow period, and a deficiency of air at the peak of the blow period. The gas mixture removed from the hood at the onset and termination intervals of the blow period contains an excess of free oxygen, while the gas mixture removed at the peak of the blow period contains an excess of carbon monoxide. Between the periods of excess free oxygen content and excess carbon monoxide content, an inert gas mixture principally containing nitrogen and carbon dioxide is removed from the hood. The interval of inert gas mixture flow effectively separates the gas mixture containing free oxygen from the gas mixture containing carbon monoxide, and permits the removal of off-gas from the air-ventilated hood using a deficiency of inducted air below the stoichiometric requirement for the total carbon monoxide combustion at the peak of the blow period, while preventing the formation of an explosive gas mixture in the gas stream removed from the hood throughout the blow period. An important feature of this invention is the complete separation and lack of dependency of the steel making function on the gas collecting and cleaning function.

BACKGROUND OF THE INVENTION

Field of the invention

The invention relates to the removal of off-gas from the air-ventilated hood of an oxygen steel converter, which produces steel from molten ferrous metal, by passing a stream of substantially pure oxygen gas above and into the molten ferrous metal. The gaseous oxygen reacts with the carbon content in the molten ferrous metal, and produces an off-gas principally containing carbon monoxide, which is discharged from the converter into a hood which is disposed about the mouth of the converter.

Description of the prior art

Conventional oxygen-lanced basic oxygen furnaces are designed to fully burn all of the carbon monoxide generated by the converter, usually in the presence of large volumes of air greater than stoichiometrically required. The gas cleaning plant is, of necessity, quite large and power requirements are correspondingly large. A hood apparatus of this nature is described in U.S. Pat. No. 3,372,917, and an apparatus for transferring the high temperature off-gas to a quencher is described in U.S. Pat. No. 3 262,685.

Non-combustion processes attempt to prevent, or at least limit, the combustion from occurring by preventing the generated carbon monoxide from contacting air. Recovery of unburned carbon monoxide, and more economical and compact gas handling equipment, are the direct advantages of these systems. However, due to the method of controls employed, various disadvantages are incurred. All previous non-combustion processes are controlled by the sensing of a static pressure at or near entrance to the gas collection hood. Thus, the control system is interlocked with the steel making operation itself. A non-combustion process is described in U.S. Pat. No. 3,215,523.

Other prior art procedures involve the use of an air-ventilated hood, with selective removal of carbon monoxide-rich off-gas portions undiluted with air from the central region of the hood. A procedure and apparatus of this nature is described in U.S. Pat. No. 3,186,831. A system for recovering waste gases from a metal refining zone which avoids the formation of an explosive mixture is described in U.S. Pat. No. 3,190,747. Other systems are described in U.S. Pat. No. 3,352 088 and British Pat. No. 1,096,795.

SUMMARY OF THE INVENTION

The system of the present invention is one in which a controlled and predetermined partial combustion of the generated off-gas is maintained at the peak of the blow period. A constant volume or flow rate of dry gas is drawn through the hood and gas cleaning system. This volume is predetermined, but adjustable if desired, and is based upon a desired percentage of stoichiometric air requirements to burn the carbon monoxide generated by the oxygen blown, during the peak of the blow period. The fixed hood is equipped with a skirt which may be remotely operated in a vertical plane to vary the annular area through which the ventilation air is drawn. Before the oxygen lance is lowered into the converter and ignition has occurred, the skirt is set at an arbitrary and uncritical position, preferably almost all the way down, to prevent puffing. Carbon monoxide generation increases rapidly to a peak. As it is increasing, the carbon monoxide combines with the oxygen in the inducted ventilation air and burns to carbon dioxide within the hood. Since a constant volume of dry gas is being drawn through the system, the oxygen content in the final gas constantly decreases while the carbon dioxide content increases. A stoichiometric ratio is reached before the peak of the blow occurs, after which the percent oxygen remains at zero, while the percent carbon monoxide increases to its maximum value at the peak of the blow.

An inert gas plug composed of carbon dioxide, nitrogen, and minor percentages of oxygen or carbon monoxide separates the initial oxygen-rich gas mixture from the carbon monoxide-rich gas which follows during the peak of the blow period.

The amount of ventilation air drawn into the hood is automatically regulated by the combined effects of the combustion reaction and the constant dry gas volume evacuation. The volume of flow rate component of ventilation air is a maximum before ignition and reaches a minimum at the peak of the blow. It is completely independent of the position of the skirt. However, optimum shop ventilation can be achieved by remote lowering of the skirt to improve the capture velocity of the ventilation air.

The control system is completely independent of the steelmaking operation. The constant dry gas flow is maintained by measuring the dry gas flow in the system, after the hot gas mixture formed in the hood is quenched or otherwise cooled, and controlling this variable by means of a throttling valve such as an adjustable venturi throat.

Should an in-process cooling tower be used, the induced draft fan will handle essentially dry gas. Constantly dry gas flow is then achieved by throttling the system to maintain constant fan amperage. This further simplifies the control system for attainment of constant dry gas flow rate and reduces the fan horsepower by approximately one-half.

The method of the present invention provides several advantages. Because a constant dry gas flow volume is maintained, the induction of excess ventilation air is prevented, and the system handles a minimum flow volume of gas. The formation of an inert gas plug or seal, during a period when oxygen or carbon monoxide content of the gas mixture drawn from the hood is below the explosive limit, prevents the formation of an explosive mixture by separating the initial and final oxygen-rich gas flows from the carbon-monoxide-rich gas flow at the peak of the blow period. The provision of an extraneous inert gas for off-gas flushing and ventilation at the spacing between the hood and the converter mouth, or during periods of minimum generation of off-gas by the converter, is no longer a requisite in the system and is obviated by the method of the present invention. The control system is completely independent of the steelmaking operation. The system and method of the present invention also incorporates the additional advantages of recovery of unburned carbon monoxide, and more economical and compact gas handling equipment. The method of the present invention provides an economical, safe system which is operated completely independent of the steelmaking operation, and which requires no manipulation or consideration by the pulpit operator in the steelmaking manufacturing facility.

It is an object of the present invention to provide an improved method for removing off-gas from an oxygen steel converter.

Another object is to provide a gas collecting and cleaning system which is completely independent of the oxygen steel making operation.

Another object is to provide a simplified control method for collecting oxygen steel converter gases under partial combustion conditions.

A further object is to provide an improved method and system for controlled partial combustion of oxygen steel converter gases.

Still another object is to remove the hot gas mixture, which is formed in the air-ventilated hood of an oxygen steel converter, at a substantially constant dry gas flow rate or volume, throughout the entire blow period.

Still a further object is to remove the hot gas mixture from the air-ventilated hood of an oxygen steel converter at a substantially constant flow rate which is at a reduced level so that ventilation air inflow is below the stoichiometric requirement for carbon monoxide combustion at the peak of the blow, whereby an oxygen-rich gas mixture is removed at the onset and termination intervals of the blow period and a carbon monoxide-rich gas mixture is removed at the peak of the blow period.

An object is to remove the hot gas mixture from the air-ventilated hood of an oxygen steel converter at a controlled and reduced constant rate, so that an intert gas plug or stream composition is formed and removed between intervals of oxygen-rich and carbon monoxide-rich gas mixture removal, so that the formation of explosive gas mixtures is prevented.

These and other objects and advantages of the present invention will become evident from the description which follows.

DESCRIPTION OF THE DRAWINGS AND PREFERRED EMBODIMENTS

Referring now to the drawings, FIG. 1 is a diagram of one embodiment of the present invention, in which substantially constant flow rate, in terms of dry gas flow volume expressed as constant moles per minute or constant standard cubic meters per minute, is measured by appropriate measurement of operating variables of the cold process gas stream saturated with vapor derived from quench liquid.

FIG. 2 is a diagram of an alternative embodiment of the invention, in which an in-process cooling tower is provided downstream from the gas quencher, to remove water vapor by sensible cooling condensation and produce an essentially dry gas at substantially constant temperature, with flow rate of the dry gas being maintained substantially constant by current or power consumption control of the induced draft blower motor.

FIG. 3 illustrates typical variation of the flow rates of ventilation air and generated carbon monoxide flowing into the converter hood, per 100 mols of dry gas mixture discharged from the hood, as a function of time from onset ignition of blow, with a constant hood discharge gas flow rate in terms of substantially constant mols per minute, and ventilation air flow rate at the peak of the blow being 25% of the stoichiometric for combustion of generated carbon monoxide.

Figure 4:
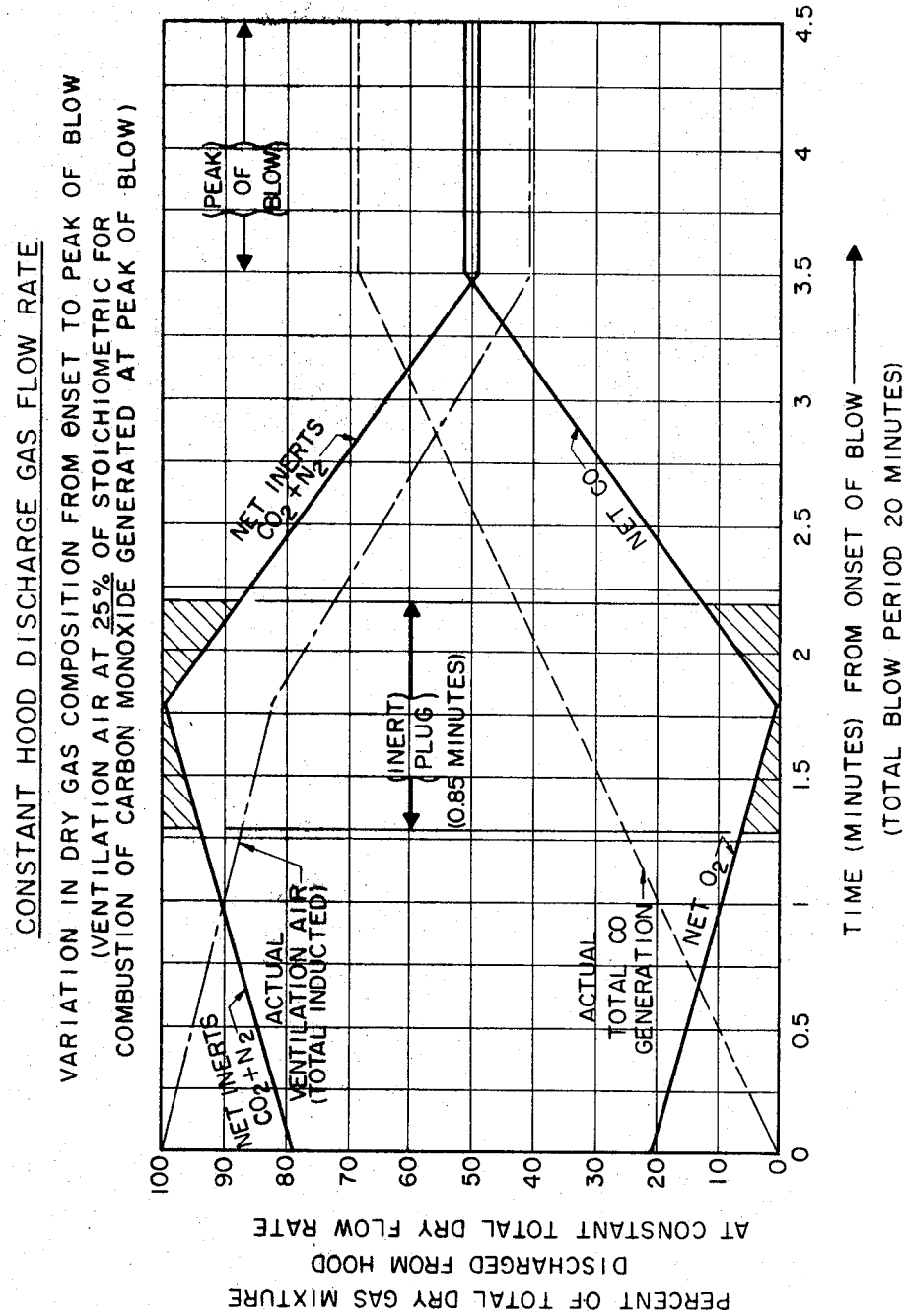
FIG. 4 illustrates the variation in composition of the dry gas discharged from the hood at constant flow rate (constant moles or standard cubic meters per minute), with ventilation air at the peak of the blow being 25% of the stoichiometric requirement for total carbon monoxide combustion.
Figure 6:
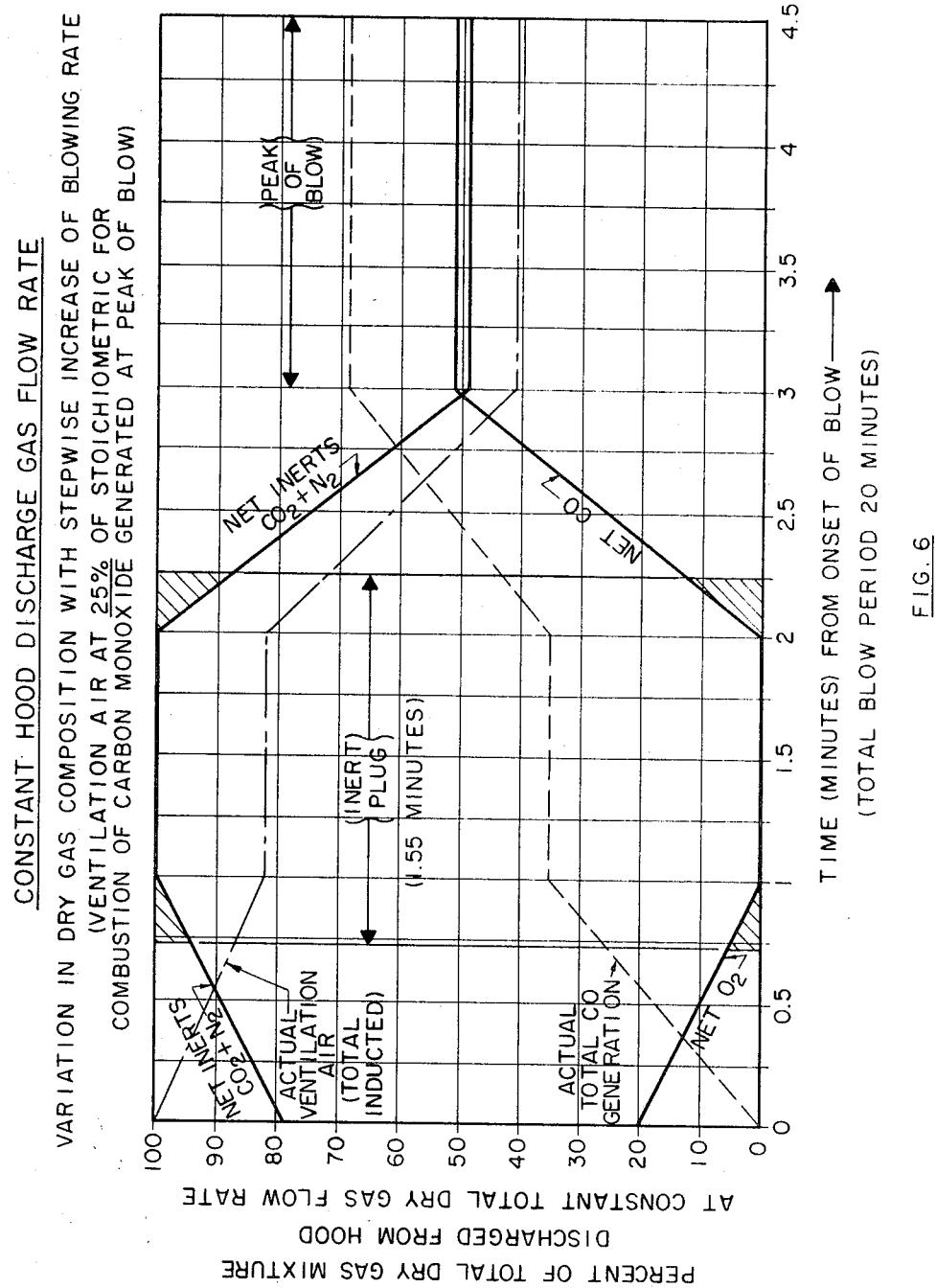
Figure 7:
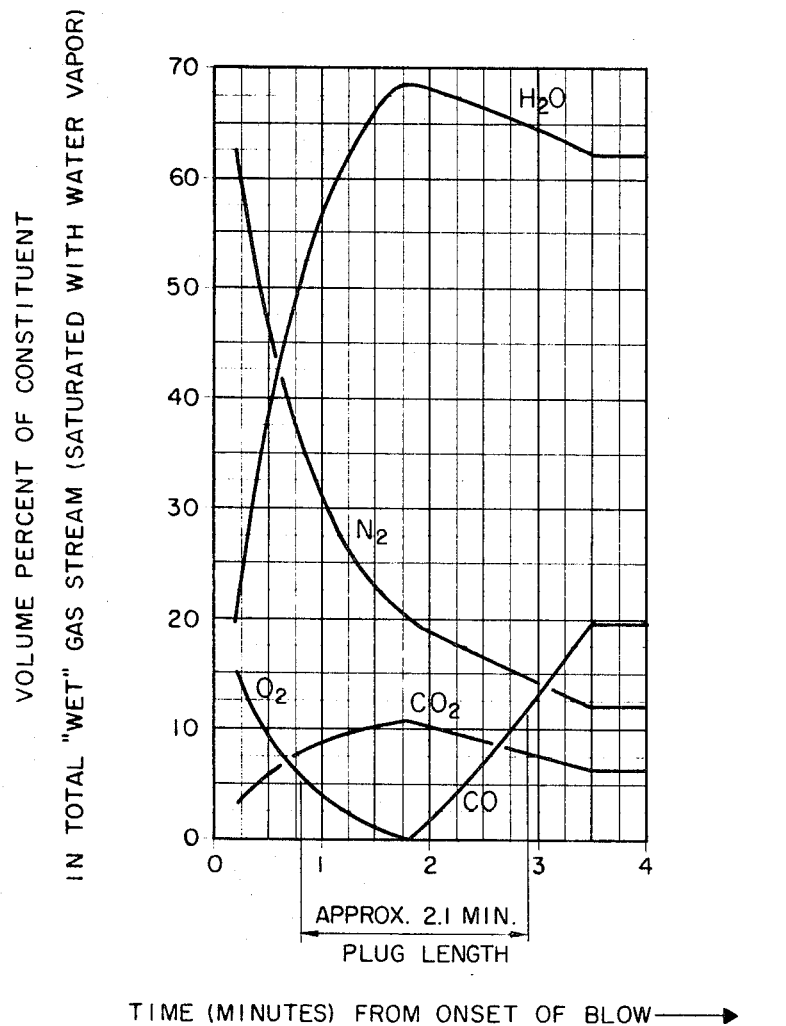

FIG. 6 is similar to FIG. 4, in providing 25% of stoichiometric ventilation air for carbon monoxide combustion at the peak of the blow, however in FIG. 6 a stepwise increase of the oxygen blowing rate is provided to lengthen the inert plug period, and FIG. 7 shows the variation in composition of the water-quenched hood discharge gas saturated with water vapor, with ventilation air at 25% of stoichiometric for total combustion of carbon monoxide generated at the peak of the blow.

Figure 1:
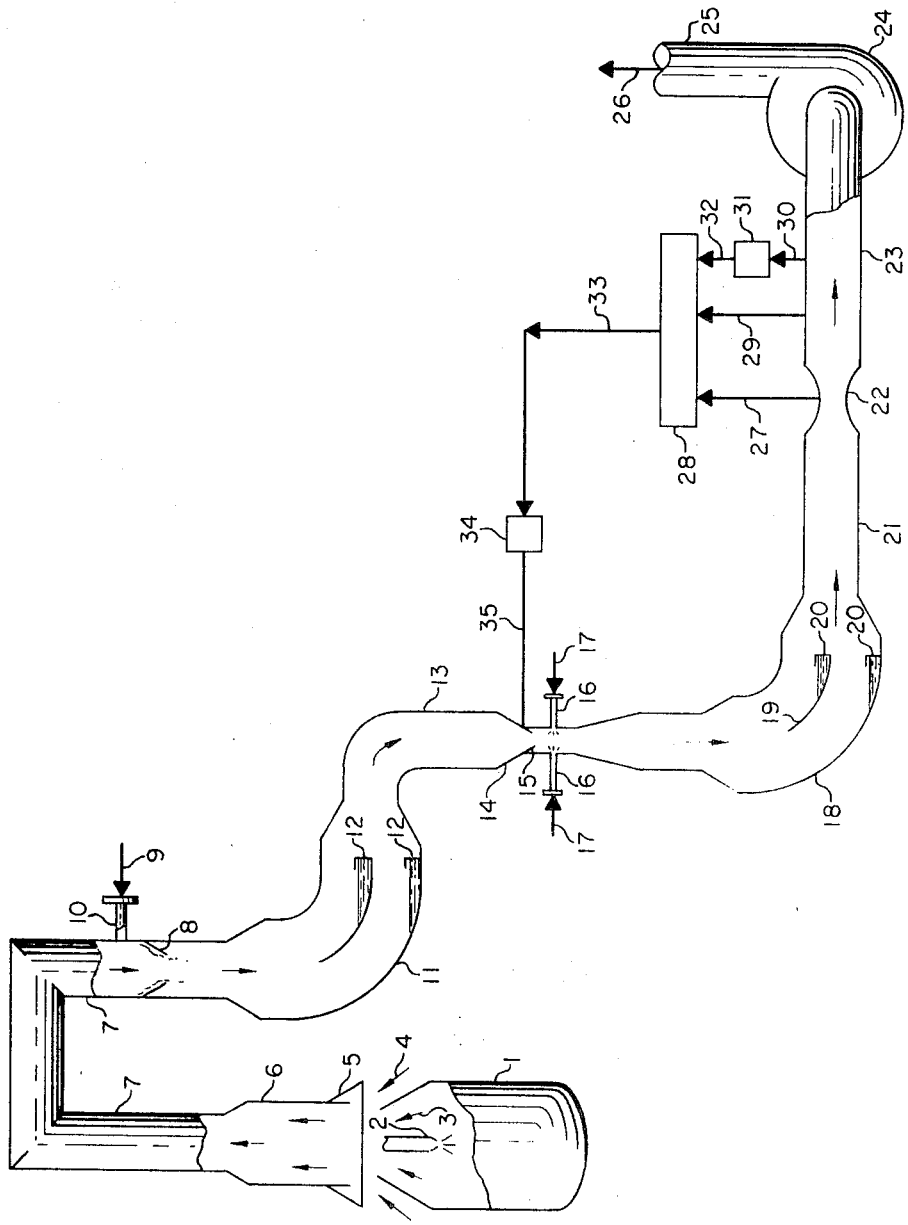

Referring now to FIG. 1, the oxygen steel converter 1 is provided with an oxygen lance 2, through which gaseous oxygen or a gas stream principally consisting of oxygen is discharged above and into a charge of molten ferrous metal contained within vessel 1. The gaseous oxygen reacts with the carbon content of the molten ferrous metal within vessel 1, and generates an off-gas stream 3 principally or totally consisting of carbon monoxide together with a minor proportion of solid iron oxide fume and inerts, which rises from the converter, and is dicharged upwards from the upper mouth of the converter. A ventilation air stream 4 is inducted inwards between the upper end of the converter 1 and the adjustable skirt 5 of the hood 6, in which the streams 3 and 4 mix and react, with carbon monoxide from stream 3 reacting with oxygen from stream 4 to form carbon dioxide. The resulting hot gas mixture in hood 6 contains nitrogen derived from ventilation air stream 4, carbon dsoxide, and either excess oxygen or excess carbon monoxide, and is formed at a temperature typically in the range of 1000° C. to 2000° C.

The hot gas mixture flows upwards from hood 6 into conduit 7, which transfers the hot gas stream downwardly into a suitable quencher such as the inverted frusto-conical baffle 8. A quench liquid stream 9 which usually consists of water is passed via nozzle 10 into conduit 7 above baffle 8. In most instances, a plurality of nozzles such as 10 will be provided in practice, with each nozzle being disposed substantially tangential to conduit 7. The quench water flows downwards across the uper surface of baffle 8, and is projected substantially transversely into the gas stream from the lower end of baffle 8. In other cases, other types of transverse or axial spray nozzles may be provided. The gas stream is quenched to a reduced temperature typically in the range of 40° C. to 100° C. by direct contact with the liquid water stream projected from element 8, with resultant evaporation of water into the gas stream. The resulting mixture of gas containing water vapor, together with excess liquid water droplets, flows into curved separating elbow 11, in which the entrained liquid water is skimmed or separated out of the gas stream. The separated water is removed from scuppers 12, and may be recycled to stream 9 by means, not shown, or processed to remove solid particles prior to recycle to either stream 9 or stream 17 to be described infra.

The resulting cold gas stream is passed via conduit 13 into the venturi scrubber 14, which is provided with an adjustable throat 15 for control of gas flow rate. The vertical venturi 14 is provided with a plurality of transverse or substantially horizontal nozzles 16, through which scrubbing water streams 17 are projected substantially horizontally and transverse to the highly accelerated gas stream in the throat section of the venturi passage 14. Dispersion of the liquid streams 17 into the gas stream as droplets takes place, with resultant scrubbing of the gas stream and removal of solids particles which are wetted and transferred to the liquid droplets phase. The resulting mixture of gas and entrained liquid water droplets flows into curved separating elbow 18, which is provided with one or more parallel curved inner baffles such as element 19. The entrained liquid water droplets are skimmed or separated out of the gas stream in elbow 18, and the separated water is removed from scuppers 20, and may be recycled to stream 17 by means, not shown, or processed to remove solid particles prior to recycle to either of streams 9 or 17.

The resulting cold and scrubbed gas streal, now saturated with water vapor and essentially free of entrained liquid water or solids particles, passes via conduit 21 to flow measurement section 22, which may in practice consist of a streamlined constriction or an orifice plate or other suitable device for measuring flow velocity by suitable means such as in terms of pressure drop across a restriction. The gas stream flows from section 22 through conduit 23 into induced draft blower or fan 24, which discharges the gas via conduit 25 as stream 26, which flows to a stack or other suitable disposal, not shown. In some cases, recovery of unburned carbon monoxide for use as a fuel gas may be desired, in which case stream 26 may be passed to a gas storage vessel during intervals of high carbon monoxide content at the peak of the blow period, with alternate discharge of stream 26 to the atmosphere between blows and during the onset and termination intervals of the blow period.

Returning to section 22, a measurement signal of pressure variation due to flow constriction is passed via line 27 to computing relay recorder-controller 28. A comparison signal of normal gas pressure is passed to unit 28 via line 29, and the temperature of the gas stream saturated with water vapor is measured via line 30, which transmits a signal to function generator 31. Unit 31 may be a computer which corrects the temperature measurement for density and water vapor content, and passes a signal via line 32 to unit 28. The water vapor content of the gas stream is a function of gas temperature. In unit 28, the measurements of lines 27 and 29 are compared, and modified in accordance with line 32, to provide a measurement and recording of dry gas flow rate in terms of standard cubic meters or moles per minute. Variations in flow rate of dry gas from a desired magnitude are compensated by transmitting a signal from unit 28 via line 33, which in turn regulates flow controller 34, which transmits a pneumatic or electrical output via line 35 to control the adjustable throat 15 of venturi 14, thereby controlling gas flow at a constant rate of dry gas flow in terms of constant moles per minute, or constant cubic meters per minute measured at standard conditions of temperature and pressure.

Figure 2:
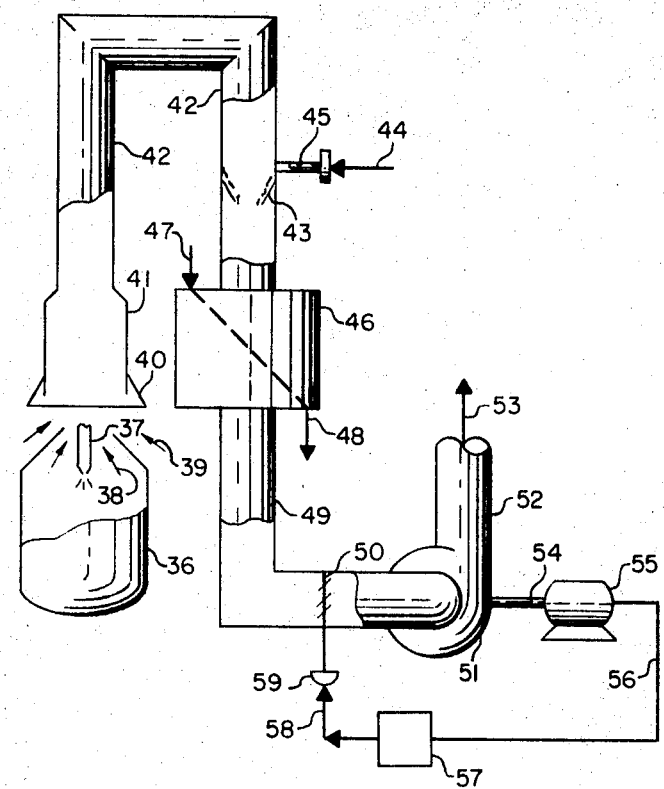

Referring now to FIG. 2, an alternative embodiment of dry gas flow control within the scope of the present invention is shown. The oxygen steel converter 36 is provided with an oxygen lance 37, through which gaseous oxygen or a gas stream principally consisting of oxygen is discharged above and into a charge of molten ferrous metal contained within vessel 36. The gaseous oxygen reacts with the carbon content of the molten ferrous metal within vessel 36, and generates an off-gas stream 38 principally or totally consistng of carbon monoxide together with a minor proporation of solid iron oxide fume and inerts, which rises from the converter 36 and is discharged upwards from the upper mouth of the converter. A ventilation air stream 39 is inducted inwards between the upper end of the converter 36 and the adjustable skirt 40 of the hood 41, in which the streams 38 and 39 mix and react, with carbon monoxide from stream 38 reacting with oxygen from stream 39 to form carbon dioxide. The resulting hot gas mixture in hood 41 contains nitrogen derived from ventilation air stream 39, carbon dioxide, and either excess oxygen or excess carbon monoxide.

The hot gas mixture flows upwards from hood 41 into conduit 42, which transfers the hot gas stream downwardly into a suitable gas quencher such as the inverted frusto-conical baffle 43. A quench liquid stream 44 which usually consists of water is passed via nozzle 45 into conduit 42 above baffle 43. In most instances, a plurality of nozzles such as 45 will be provided in practice, with each nozzle being disposed tangential to conduit 42. The quench water flows downwards across the upper surface of baffle 43, and is projected substantially transversely into the gas stream from the lower end of baffle 43. In other cases, other types of transverse or axial spray nozzles may be provided. The gas stream is quenched to a reduced temperature by direct contact with the liquid water stream projected from element 43, with resultant evaporation of water into the gas stream. The resulting mixture of gas containing water vapor, together with excess liquid water droplets, may now be passed through units similar to elements 11, 14 and 18 described supra- not shown. In any case, the final gas stream containing water vapor is passed through in-process cooling tower 46, for direct contact with cold water stream 47, which is at a temperature typically in the range of 5° C. to 20° C. and which cools the gas stream to a very low temperature and effectively condenses essentially all of the water vapor from the gas stream. The cold water is removed from unit 46 via stream 48.

The resulting cold dry gas is removed from unit 46 via conduit 49, which passes the dry gas through the louvered control damper 50 and into the induced draft fan or blower 51. The blower 51 discharges the gas via conduit 52 as stream 53, which flows to a stack or other suitable disposal, not shown. Stream 53 may be utilized in a manner similar to stream 26 described supra.

Returning to blower 51, shaft 54 extending from electric motor 55 serves to rotate and drive the blower 51. The amperage of electric current or electric power passed to motor 55 is measured by line 56, which transmits a measurement to controller 57. The controller 57 transmits an electrical or pneumatic signal via line 58 to valve controller 59 which in turn adjusts the setting of unit 50 to provide substantially constant dry gas flow rate, which in turn provides essentially constant amperage or power consumption by unit 55.

Figure 3:
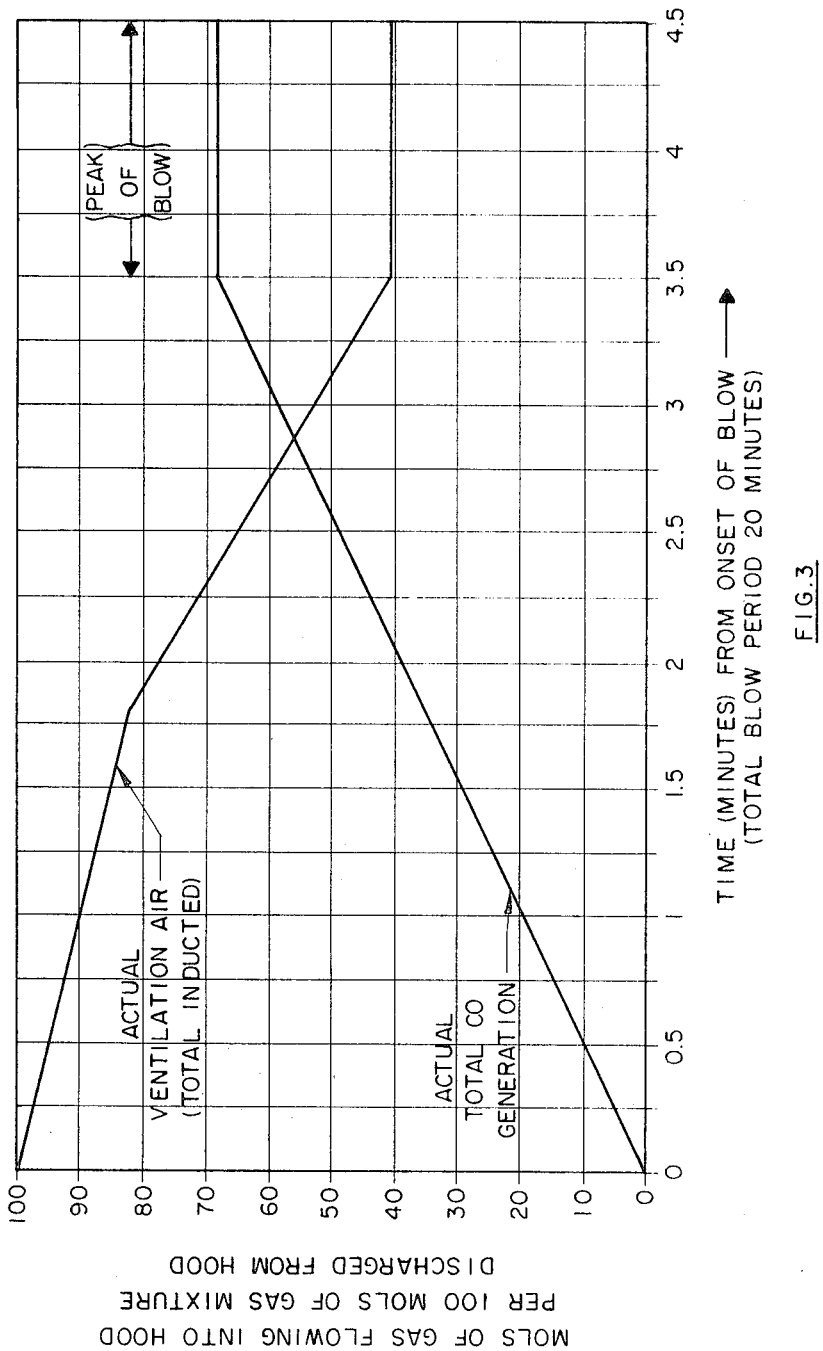

FIG. 3 shows typical actual flow rates of the input streams to the converter hood, from the onset ignition of the blow period to the peak of the blow period, with a substantially constant rate of hot gas removal from the hood, when measured at standard conditions. At the onset of the blow period, zero minutes, there is no actual flow of gaseous oxygen into the converter, and no flow of generated carbon monoxide. Thus, 100 mols of ventilation air are inducted into the hood. As the rate of actual total carbon monoxide generated increases from zero, in an idealized substantially constant rate of increase, the carbon monoxide reacts with the oxygen content of the air and burns to carbon dioxide, to provide a net increase in gas volume, in terms of mols carbon dioxide compared to mols oxygen derived from ventilation air. The rate of ventilation air induction is thus lowered, since the total mols of gas removed from the hood is maintained substantially constant. From zero minutes to 1.8 minutes, the oxygen component of the ventilation air is in stoichiometric excess relative to the generated carbon monoxide, and the hot gas mixture formed in the hood after carbon monoxide combustion contains nitrogen, carbon dioxide and excess oxygen. From 1.8 minutes to 3.5 minutes, all of the oxygen component of the ventilation air is consumed in carbon monoxide oxidation, and excess carbon monoxide is present in the hot gas mixture, which therefore contains nitrogen, carbon dioxide and carbon monoxide. During this interval from 1.8 minutes to 3.5 minutes, the actual ventilation air rate continues to diminish at a more rapid rate, since unburned carbon monoxide component is being added to the hot gas mixture at an increasing rate and the total of the hot gas mixture removed from the hood remains constant. After 3.5 minutes, the peak of the blow period begins, with substantially constant carbon monoxide generation rate, total consumption of the oxygen content of ventilation air by carbon monoxide oxidation, and corresponding induction of actual ventilation air at a reduced constant rate. The total mols of actual ventilation air plus actual total carbon monoxide generation is greater than 100 mols during the peak of the blow, since there is a net contraction in total gas volume within the hood due to carbon monoxide reaction with oxygen content of the ventilation air, and the final hot gas mixture formation within the hood is maintained constant at 100 mols. Considerations in reverse to those shown in FIG. 3 apply during the termination interval of the blow period, with actual total carbon monoxide generation decreasing in a uniform manner to zero and actual total ventilation air inducted increasing to 100 mols per 100 mols of gas mixture discharged from the hood.

Referring now to FIG. 4, the percent composition of the total dry gas mixture discharged from the hood, at constant hood discharge gas flow rate in terms of mols or standard cubic meters per minute, is shown for the time period from the onset of ignition to the peak of the blow period, for the condition in which ventilation air is maintained at 25% of the stoichiometric requirement for total combustion of the carbon monoxide generated at the peak of the blow. Thus, the graphs of FIG. 4 show the content of the hot gas mixture discharged from the hood. For comparison purposes, the graphs of FIG. 3 showing the actual ventilation air and carbon monoxide generation gas streams passing into the hood are also shown on FIG. 4. FIG. 4 also shows that an interval of 0.85 minute of inert gas plug or substantially inert gas mixture exists between the initial onset interval in which the gas contains a net excess free oxygen content and the major portion of the blow in which excess carbon monoxide is present in the gas mixture.

At the onset of the blow period in FIG. 4, at zero minutes, the hood gas mixture is air, with the composition of air consisting of 79% by volume nitrogen (net inerts) and 21% by volume oxygen (net oxygen) being discharged from the hood. As the actual total carbon monoxide generation increases, from zero to 1.3 minutes, the net oxygen decreases due to consumption in carbon monoxide oxidation; and the total net inerts, consisting of nitrogen plus carbon dioxide derived from carbon monoxide oxidation, increases until about 93% by volume of the total dry gas mixture discharged from the hood is inerts. At this point of 1.3 minutes, the generation of a substantially inert gas plug begins, and from 1.3 minutes to 1.8 minutes the net free oxygen in the discharged gas mixture decreases from about 6% by volume to substantially zero, while the net inerts increases to substantially 100% by volume. The shaded areas on the graph from 1.3 minutes to 1.8 minutes are provided to indicate that the gas mixture discharged from the hood during this time interval is substantially inert. At 1.8 minutes, the actual total carbon monoxide generated is exactly sufficient to consume exactly all of the free oxygen in the ventilation air, and consequently the net oxygen is zero and the net inerts in the hood discharge gas mixture is 100%, that is, the hood discharge gas mixture consists entirely of a mixture of nitrogen and carbon dioxide.

From 1.8 minutes to 2.2 minutes, the carbon monoxide generation rate is in excess of the proportion required to consume the oxygen in the ventilation air, and consequently the hood discharge gas stream contains an excess of free carbon monoxide and the net inerts percentage by volume in the dry gas mixture diminishes from 100% to 88%. Since the net carbon monoxide content in the gas mixture from 1.8 minutes up to 2.2 minutes is less than 12% by volume, the gas mixture is substantially inert during this time interval, and the shaded areas on the graph from 1.8 minutes to 2.2 minutes are provided to indicate that the gas mixture discharged from the hood during this time interval is substantially inert.

From 2.2 minutes to 3.5 minutes, the idalized rate of actual carbon monoxide generation increases further and consequently the net carbon monoxide in the hood discharge gas mixture increases to a maximum value of 51%, while the balance of the gas mixture consisting of net inerts decreases to 49%. After 3.5 minutes the peak of the blow is reached, the actual total carbon monoxide generation rate remains substantially constant, and the actual ventilation air induction rate remains substantially constant. Thus, the net carbon monoxide in the hot gas mixture removed from the hood remains constant at 51% by volume, and the net inerts in the hot gas mixture remains constant at 49%.

It is evident that during the peak of the blow, the actual total carbon monoxide generation is 68 mols per 100 mols of discharged gas mixture, while the net carbon monoxide in the discharged gas mixture is 51% or 51 mols per 100 mols of discharged gas mixture. Thus, 17 mols of carbon monoxide or 25% of the generated carbon monoxide is consumed in reaction with free oxygen derived from ventilation air, which illustrates the selected operating parameter for FIG. 4 in that the ventilation air is 25% of the stoichiometric for combustion of carbon monoxide generated, at the peak of the blow period.

In summary, under the selected operation conditions of FIG. 4 including the inventive concept of constant hood discharge gas flow rate in terms of total mols or standard cubic meters per minute, with the rate of actual total carbon monoxide generation increasing in an idealized substantially liner manner from zero to a maximum value at 3.5 minutes when the peak of the blow period is reached, and concomitant decrease in the rate of actual inducted ventilation air, a substantially inert gas plug of 0.85 minute duration is generated between the intervals of gas mixture composition rich in free oxygen and gas mixture composition rich in free carbon monoxide, and consequently the mixing of these gas mixtures with resultant possibility of explosion is effectively prevented.

Similar considerations apply during the termination interval of the blow period, with the rate of actual total carbon monoxide generation decreasing in an idealized substantially uniform manner, and the rate of ventilation air induction correspondingly increasing to provide costant hood discharge dry gas flow rate, and a second inert gas plug of substantially inert gas composition being formed during the termination interval of the blow period.

Figure 5:
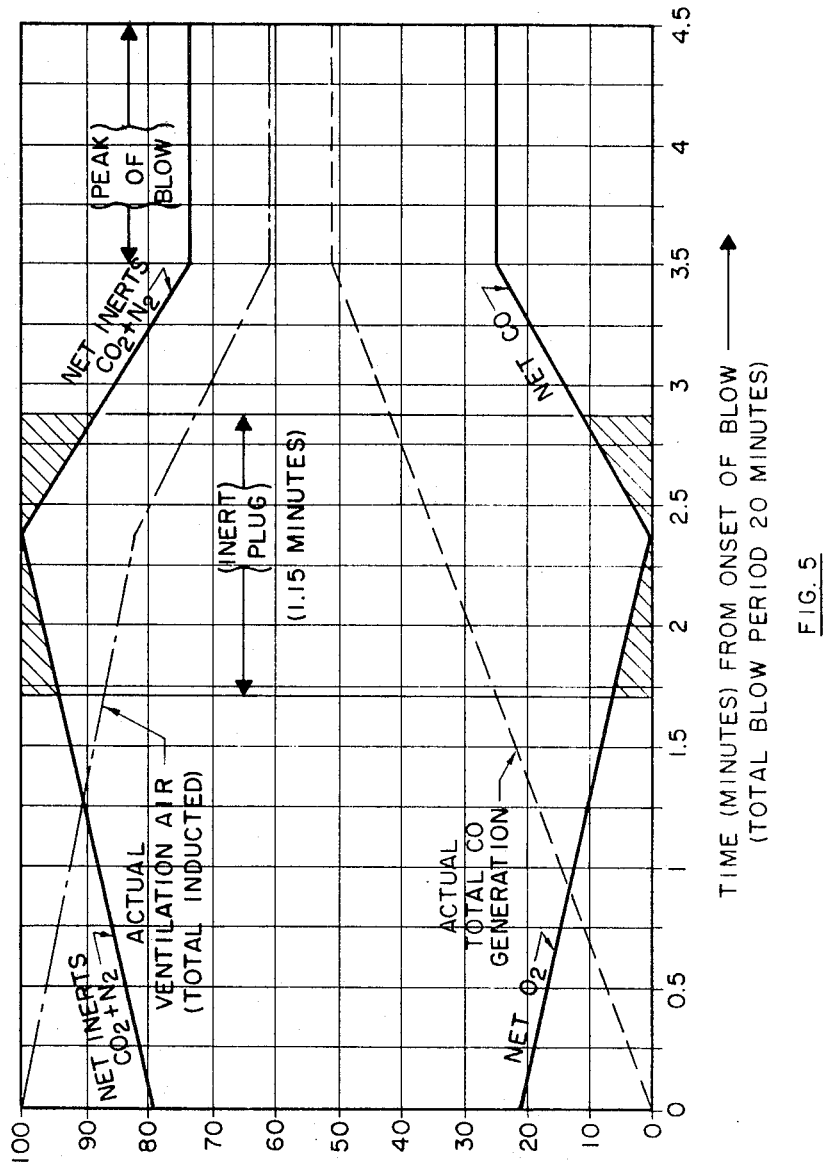
FIG. 5 shows the variation in composition of the dry gas discharged from the hood at constant flow rate (constant moles or standard cubic meters per minute), with ventilation air at the peak of the blow being 50% of the stoichiometric requirement for total carbon monoxide combustion.

FIG. 5 illustrates the variations in dry gas composition from the ignition onset of the blow period to the peak of the blow period, with ventilation air at 50% of the stoichiometric requirement for combustion of carbon monoxide generated at the peak of the blow period. Under this operating condition, and with constant dry gas discharge flow rate from the hood, the duration of the inert plug is lengthened to 1.15 minutes, compared to the 0.85 minute duration of FIG. 4. The duration time interval of the inert plug becomes longer as greater total volumes or rate of hood discharge gas are handled, corresponding to larger percentages of theoretical air for carbon monoxide combustion. The net carbon monoxide percentage in the hood discharge gas mixture is 26% at the peak of the blow period, corresponding to 26 mols of carbon monoxide per 100 mols of discharged gas, which is 50% of the total actual carbon monoxide generation of 52 mols carbon monoxide per 100 mols discharged gas at the peak of the blow period.

Another modification of the procedure of the present invention may be provided to lengthen the duration of the inert plug interval, instead of or in addition to increasing the percentage of ventilation air relative to carbon monoxide generation rate at the peak of the blow period. This alternative modification is illustrated in FIG. 6, and consists of stepwise increase of the oxygen blowing rate, with consequent stepwise increase of the actual total carbon monoxide generation rate. In the sequence of FIG. 6, the duration of the time interval from zero minutes at ignition to the peak of the blow is shortened to 3.0 minutes, and at the peak of the blow the ventilation air rate is 25% of the stoichiometric for combustion of carbon monoxide generated, which is similar to the peak or maximum blowing rate conditions of FIG. 4. In FIG. 6, the actual total carbon monoxide generation rate is rapidly increased to 35 mols per 100 mols of hood discharge dry gas at 1 minute, while the ventilation air induction rate is rapidly decreased, so that the generation of an inert gas plug begins at 0.7 minute and essentially 100% net inerts is present at 1 minute in the hot dry gas mixture formed in the hood. From 1 minute to 2 minutes, the oxygen blowing rate is maintained substantially constant, and thus the rates of actual total carbon monoxide generation and actual total inducted ventilation air remain essentially constant and balanced from 1 to 2 minutes at a stoichiometric proportion for total combustion of carbon monoxide to carbon dioxide and total consumption of the oxygen content of the inducted ventilation air by carbon monoxide oxidation, so that the net inerts in the hood discharge gas remains constant at 100%, and only inert gas mixture containing nitrogen and carbon dioxide is discharged from the hood. After 2 minutes, the total carbon monoxide generation rate is rapidly increased to the maximum rate at the peak of the blow, which begins at 3 minutes. The net carbon monoxide in the hot gas mixture increases from zero at 2 minutes to about 12% at 2.25 minutes, and therefore during this time interval of 0.25 minute the hot hood discharge gas mixture contains carbon monoxide in a proportion less than the explosive range, and the discharged gas from 2 minutes to 2.25 minutes forms a portion of the inert gas plug, which therefore extends from 0.7 minute to 2.25 minutes, or a duration of 1.55 minutes.

FIG. 7 shows the composition of the "wet" or water-quenched gas stream saturated with water vapor, which is generated with the ventilation air at 25% of stoichiometric for carbon monoxide combustion at the peak of the blow, and therefore FIG. 7 corresponds to the operating conditions of FIG. 4. Due to the inclusion of water vapor in the total gas mixture, the wet gas stream has an appreciably lengthened duration of the inert plug interval, of about 2.1 minutes, compared to the 0.85 minute interval of FIG. 4 for the dry hood gas mixture. The dilution effect of the added water vapor thus effectively lengthens the duration of the inert plug interval, however, this added safety factor only takes effect downstream of the quencher, and does not affect considerations relative to explosion potential in the hood and gas conduit before the quencher. In any case, the effect of water vapor dilution is beneficial in lengthening the duration of the inert gas plug interval in the subsequent processing of the quenched gas stream.

Numerous alternatives within the scope of the present invention will occur to those skilled in the art, besides those mentioned supra. The ranges of operating variables such as gas temperatures constitute preferred embodiments of the present invention for optimum utilization of the concepts of the invention, however the invention may be practiced outside of these ranges in suitable instances. In most instances, water or an aqueous solution principally consisting of water will be employed as the quench liquid, however in some cases alternative liquids may be employed for this purpose, such as a liquid hydrocarbon fraction which would be at least partially cracked during the quench step, so as to produce an enriched fuel gas as the final product of the process.

In most instances, the rate of ventilation air induction into the hood during the middle peak interval of the blow period will be at a substantially constant magnitude in the range of about 25% to 50% of the proportion equivalent to complete combustion of carbon monoxide in the converter off-gas to carbon dioxide, and usually less than a 50% proportion, since above a 50% proportion the volume of hot gas mixture becomes excessive due to dilution with the inert nitrogen component of the ventilation air, and the consequent size and cost of the quencher, gas scrubber, induced draft fan and associated ductwork and conduits becomes excessive. Below a 25% ventilation proportion, the length of the duration of the inert gas plug interval is appreciably shortened, unless stepwise increase of actual total carbon monoxide generation rate is provided, and thus in most cases the ventilation air at the peak of the blow will be maintained at a relative magnitude which is at least about 10% of the stoichiometric for combustion of carbon monoxide generated at the peak of the blow.

An example of an industrial application of the present invention will now be described.

EXAMPLE

The method of the present invention was applied to the operation of a 200 net tons per charge oxygen steel converter. The oxygen blowing rate was constant at 565.5 standard cubic meters per minute (s.c.m.m.) of oxygen throughout the blow period. The system was operated with ventilation air at 25% of stoichiometric at the peak of the blow in accordance with FIG. 4. Following is data relative to flow rates of principal process gas streams at different time points from the onset of the blow period.

| Time (min.) | Carbon monoxide generation, s.c.m.m. | Ventilation s.c.m.m. | Dry gas in hood s.c.m.m. | Saturated gas (wet) | |
|---|---|---|---|---|---|
| | | | | S.c.m.m. | Actual cu. meters, minute |
| 0.00 | 0 | 1,670 | 1,670 | 1,670 | 1,811 |
| 1.30 | 420 | 1,460 | 1,670 | 4,530 | 5,440 |
| 1.80 | 580 | 1,380 | 1,670 | 5,380 | 6,800 |
| 2.15 | 696 | 1,231 | 1,670 | 5,240 | 6,600 |
| 3.50 | 1,132 | 680 | 1,670 | 4,390 | 5,440 |

I claim:
1. In a process for the production of steel from molten ferrous metal in which a charge of molten ferrous metal is passed into a converter, said converter being provided with an air-ventilated hood, a stream of substantially pure oxygen is passed above and onto said charge of molten ferrous metal within said converter during a blow period having a middle peak interval of maximum oxygen flow and carbon monoxide generation, whereby an off-gas principally consisting of carbon monoxide is discharged from said converter into said hood, a mixture of off-gas and inducted air is formed in said hood, whereby carbon monoxide in said off-gas reacts with oxygen content in the inducted air in a combustion reaction to form carbon dioxide, the resulting hot gas mixture is removed from said hood, and the removed hot gas mixture is quenched to a reduced temperature by direct contact with a quench liquid, said quench liquid being at least partially vaporized into said gas mixture, whereby a total cold gas mixture containing vaporized quench liquid is formed, the improved method of removing said hot gas mixture from said hood which comprises (a) measuring the flow rate of the net cold gas mixture components excluding vaporized quench liquid in said total cold gas mixture, and (b) controlling the flow rate of said total cold gas mixture during the blow period to provide a substantially constant magnitude of the net flow rate of dry gas components excluding quench vapor and measured according to step (a), at a level which maintains the rate of air induction into said hood during the middle peak interval of said blow period at a magnitude which is less than the proportion required for complete combustion of generated carbon monoxide to carbon dioxide, and which maintains the rate of air induction during the onset interval and during the termination interval of the blow period at a magnitude which is greater than the proportion required for complete combustion of carbon monoxide to carbon dioxide, whereby said hot gas mixture principally contains free oxygen, nitrogen and carbon dioxide during the onset interval of the blow period; an inert gas mixture principally consisting of nitrogen and carbon dioxide between the onset interval and the middle peak interval of the blow period; carbon monoxide, nitrogen and carbon dioxide during the middle peak interval of the blow period; an inert gas mixture principally consisting of nitrogen and carbon dioxide between the middle peak interval and the termination interval of the blow period; and free oxygen, nitrogen and carbon dioxide during the termination interval of the blow period.

2. The method of claim 1, in which said quench liquid is water.

3. The method of claim 1, in which the rate of air induction into said hood during the middle peak interval of said blow period is less than 50% of the proportion equivalent to complete combustion of carbon monoxide in said off-gas to carbon dioxide, whereby substantially all of the oxygen content of the air inducted into said hood during the middle peak interval of the blow period is reacted with carbon monoxide.

4. The method of claim 1, in which said hot gas mixture is formed at a temperature in the range of 1000° C. to 2000° C., and said cold gas mixture is formed at a temperature in the range of 40° C. to 100° C.

5. The method of claim 1, in which the flow rate of said substantially pure oxygen stream during the middle peak interval of said blow period is substantially greater than the flow rate of said substantially pure oxygen stream during the onset and termination intervals of the blow period. the flow rate of said substantially pure oxygen stream is rapidly increased in a stepwise manner before the middle peak interval of said blow period, and the flow rate of said substantially pure oxygen stream is rapidly decreased in a stepwise manner after the middle peak interval of said blow period, whereby the blow period intervals during which inert gas mixture is produced are substantially lengthened.

6. In a process for the production of steel from molten ferrous metal in which a charge of molten ferrous metal is passed into a converter, said converter being provided with an air-ventilated hood, a stream of substantially pure oxygen is passed above and onto said charge of molten ferrous metal within said converter during a blow period having a middle peak interval of maximum oxygen flow and carbon monoxide generation, whereby an off-gas principally consisting of carbon monoxide is discharged from said converter into said hood, a mixture of off-gas and inducted air is formed in said hood, whereby carbon monoxide in said off-gas reacts with oxygen content in the inducted air in a combustion reaction to form carbon dioxide, the resulting hot gas mixture is removed from said hood, the removed hot gas mixture is quenched to a reduced temperature by direct contact with a stream of water, said water stream being at least partially vaporized into said gas mixture, whereby a cold gas mixture containing vaporized water is formed, and water vapor is substantially completely removed from said cold gas mixture to provide a final cold dry gas stream, the improved method of removing said hot gas mixture from said hood which comprises controlling the flow rate of said final cold dry gas stream at a substantially constant magnitude during the blow period, the magnitude of the controlled flow rate of said final cold dry gas stream being at a level which maintains the rate of air induction into said hood during the middle peak interval of said blow period at a magnitude which is less than the proportion required for complete combustion of generated carbon monoxide to carbon dioxide, and which maintains the rate of air induction during the onset interval and during the termination interval of the blow period at a magnitude which is greater than the proportion required for complete combustion of carbon monoxide to carbon dioxide, whereby said hot gas mixture principally contains free oxygen, nitrogen and carbon dioxide during the onset interval of the blow period; an inert gas mixture principally consisting of nitrogen and carbon dioxide between the onset interval and the middle peak interval of the blow period; carbon monoxide, nitrogen and carbon dioxide during the middle peak interval of the blow period; an inert gas mixture principally consisting of nitrogen and carbon dioxide between the middle peak interval and the termination interval of the blow period; and free oxygen, nitrogen and carbon dioxide during the termination interval of the blow period.

7. The method of claim 6, in which the rate of air induction into said hood during the middle peak interval of said blow period is less than 50% of the proportion equivalent to complete combustion of carbon monoxide in said off-gas to carbon dioxide, whereby substantially all of the oxygen content of the air inducted into said hood during the middle peak interval of the blow period is reacted with carbon monoxide.

8. The method of claim 6, in which said hot gas mixture is formed at a temperature in the range of 1000° C. to 2000° C., and said cold gas mixture is formed at a temperature in the range of 40° C. to 100° C.

9. The method of claim 6, in which the flow of said substantially pure oxygen stream during the middle peak interval of said blow period is substantially greater than the flow rate of said substantially pure oxygen stream during the onset and termination intervals of the blow period, the flow rate of said substantially pure oxygen stream is rapidly increased in a stepwise manner before the middle peak interval of said blow period, and the flow rate of said substantially pure oxygen stream is rapidly decreased in a stepwise manner after the middle peak interval of said blow period, whereby the blow period intervals during which inert gas mixture is produced are substantially lengthened.

10. The method of claim 6, in which the flow rate of said final cold dry gas stream is controlled at a substantially constant magnitude during the blow period by inducting said final cold dry gas stream into mechanical gas induction means, said mechanical gas induction means being driven by an electrical motor, and throttling the input flow of said cold dry gas stream into said mechanical gas induction means to maintain substantially constant amperage flow of electrical current to said electrical motor.

11. The method of claim 10, in which said mechanical gas induction means is an induced draft fan.

12. The method of claim 6, in which water vapor is substantially completely removed from said cold gas mixture to provide said final cold dry gas stream by further cooling the quenched cold gas mitxure containing vaporized water to a lower temperature, whereby water vapor is selectively condensed from said gas mixture.

References Cited

UNITED STATES PATENTS

| | | | |
|---|---|---|---|
| 2,831,762 | 4/1058 | Kemmetmuller et al. | 75—60 |
| 3,218,158 | 11/1965 | Fillon | 75—60 |
| 3,222,045 | 12/1965 | Spetzler | 75—60X |
| 3,321,302 | 5/1967 | Rieder | 75—60 |
| 3,395,512 | 8/1968 | Finney, Jr. et al. | 75—60X |
| 3,409,283 | 11/1968 | Helm | 75—60X |
| 3,372,023 | 3/1968 | Krainer et al. | 75—60 |

L. DEWAYNE RUTLEDGE, Primary Examiner

G. K. WHITE, Assistant Examiner